United States Patent
Watanabe

Patent Number: 5,260,973
Date of Patent: Nov. 9, 1993

[54] DEVICE OPERABLE WITH AN EXCELLENT SPECTRUM SUPPRESSION

[75] Inventor: Nozomu Watanabe, Tokyo, Japan

[73] Assignee: NEC Corporation, Tokyo, Japan

[21] Appl. No.: 722,824

[22] Filed: Jun. 28, 1991

[30] Foreign Application Priority Data

Jun. 28, 1990 [JP] Japan .................................. 2-171166

[51] Int. Cl.⁵ ............................................ H04L 27/04
[52] U.S. Cl. .................................. 375/59; 375/68; 330/135
[58] Field of Search ................... 375/59, 60, 62, 68; 455/120, 116; 330/135, 147; 332/117, 120, 123, 107

[56] References Cited

U.S. PATENT DOCUMENTS 4,592,073  5/1986  Watanabe ........................... 375/60
4,706,262  11/1987  Ohta ................................ 375/68 X Primary Examiner—Curtis Kuntz
Assistant Examiner—Tesfaldet Bocure
Attorney, Agent, or Firm—Sughrue, Mion, Zinn, Macpeak & Seas

[57] ABSTRACT

In a device for use in processing a baseband input signal and a carrier signal into an envelope output signal, a processing unit (3) is supplied with the baseband input signal and the carrier signal and produces, as a produced signal, a modulated signal and a non-modulated signal one at a time in response to a burst control signal. A waveform generating unit (2) is supplied with the burst control signal and generates a control signal. An amplifying unit (4) is supplied with the produced signal and the control signal and amplifies the produced signal to make the envelope output signal represent an envelope of the produced signal and to produce the envelope output signal with an excellent spectrum suppression. Alternatively, the processing unit may be supplied with the control signal instead of the burst control signal.

7 Claims, 4 Drawing Sheets

DEVICE OPERABLE WITH AN EXCELLENT SPECTRUM SUPPRESSION

BACKGROUND OF THE INVENTION

This invention relates to a device for use in processing a baseband input signal and a carrier signal into an envelope output signal and, more particularly, to an improvement in spectrum suppression under a burst switching condition used in a TDMA type radio communication apparatus in which a modulated signal has an envelope.

In general, a device of the type described is supplied with a baseband input signal and a carrier signal to produce an envelope output signal.

The device comprises a modulating unit responsive to the baseband input signal and the carrier signal for producing a modulated signal variable within a power range. A waveform generating unit is supplied with a burst control signal and generates a control signal for controlling the power range into a controlled region. An amplifying unit is connected to the modulating unit and the waveform generating unit and amplifies the modulated signal having the controlled region to make the envelope output signal represent an envelope of the modulated signal and to produce the envelope output signal.

A conventional device is disclosed in U.S. Pat. No. 4,592,073 issued to Kyoji Watanabe and assigned to NEC Corporation. According to Watanabe patent, the device comprises a waveform generating unit for receiving the burst control signal having a rectangular waveform and for generating the control signal for controlling the power range into the controlled region. The control signal has a controlled shape comprising sloping leading and trailing edges and a plateau between the sloping leading and trailing edges. The modulating unit always modulates the baseband input signal and the carrier signal into the modulating signal with no consideration given to the burst control signal. The amplifying unit amplifies the modulating signal having the controlled region to make the envelope output signal represent the envelope of the modulating signal. As a result, the envelope output signal has a shape which is similar to the controlled shape. Therefore, the modulated signal is amplified throughout the sloping leading and trailing edges and the plateau.

However, it has now been found by the present inventor that it is impossible to suppress a spectrum divergence of the envelope output signal within a predetermined guard mask which is a permitted limit of the spectrum divergence in the envelope output signal. When the spectrum divergence overrun the guard mask, a jamming occurs as a result of the envelope output signal. Therefore, a transmission interference occurs. This is because the modulated signal inevitably has an inherent band. Even if the amplifying unit tries to amplify the modulated signal in due consideration of the inherent band in order to avoid such a trouble, a very delicate adjustment is required in the amplifying unit.

SUMMARY OF THE INVENTION

It is therefore an object of the present invention to provide a device for improving a spectrum suppression under a burst switching condition.

It is another object of this invention to provide a device of the type described, which can suppress a spectrum divergence within a predetermined guard mask.

It is still another object of this invention to provide a device of the type described, which can suppress a spectrum divergence with no need for delicate adjustment.

On describing the gist of an aspect of this invention, it is possible to understand that a device is for use in processing a baseband input signal and a carrier signal into an envelope output signal. The device comprises producing means responsive to the baseband input signal and the carrier signal for producing a produced signal variable having a power range. Responsive to a burst control signal, waveform generating means generates a control signal for controlling the power range into a controlled region. Amplifying means is connected to the producing means and the waveform generating means and amplifies the produced signal having the controlled region to make said envelope output signal represent an envelope of the produced signal and to produce the envelope output signal.

According to this aspect of the invention, the producing means comprises modulating means for modulating the baseband input signal and the carrier signal into the produced signal, and switching means supplied with the burst control signal for switching on and off the modulating means to produce a modulated signal and a non-modulated signal one at a time as the produced signal having the controlled region.

On describing the gist of another aspect of this invention, it is possible to understand that a device which is for use in processing a baseband input signal and a carrier signal into an envelope output signal. The device comprises producing means responsive to the baseband input signal and the carrier signal for producing a produced signal variable having a power range. Waveform generating means responsive to a burst control signal generates a control signal for controlling the power range into a controlled region. Amplifying means is connected to the producing means and the waveform generating means and amplifies the produced signal having the controlled region to make the envelope output signal represent an envelope of the produced signal and to produce the envelope output signal.

According to this aspect of the invention, the producing means comprises modulating means for modulating the baseband input signal and the carrier signal into the produced signal, and switching means supplied with the control signal for switching on and off the modulating means to produce a modulated signal and a non-modulated signal one at a time as the produced signal having the controlled region.

DESCRIPTION OF THE PREFERRED EMBODIMENTS:

A device in accordance with the present invention is supplied with a baseband input signal and a carrier signal and produces an envelope output signal.

Figure 1:
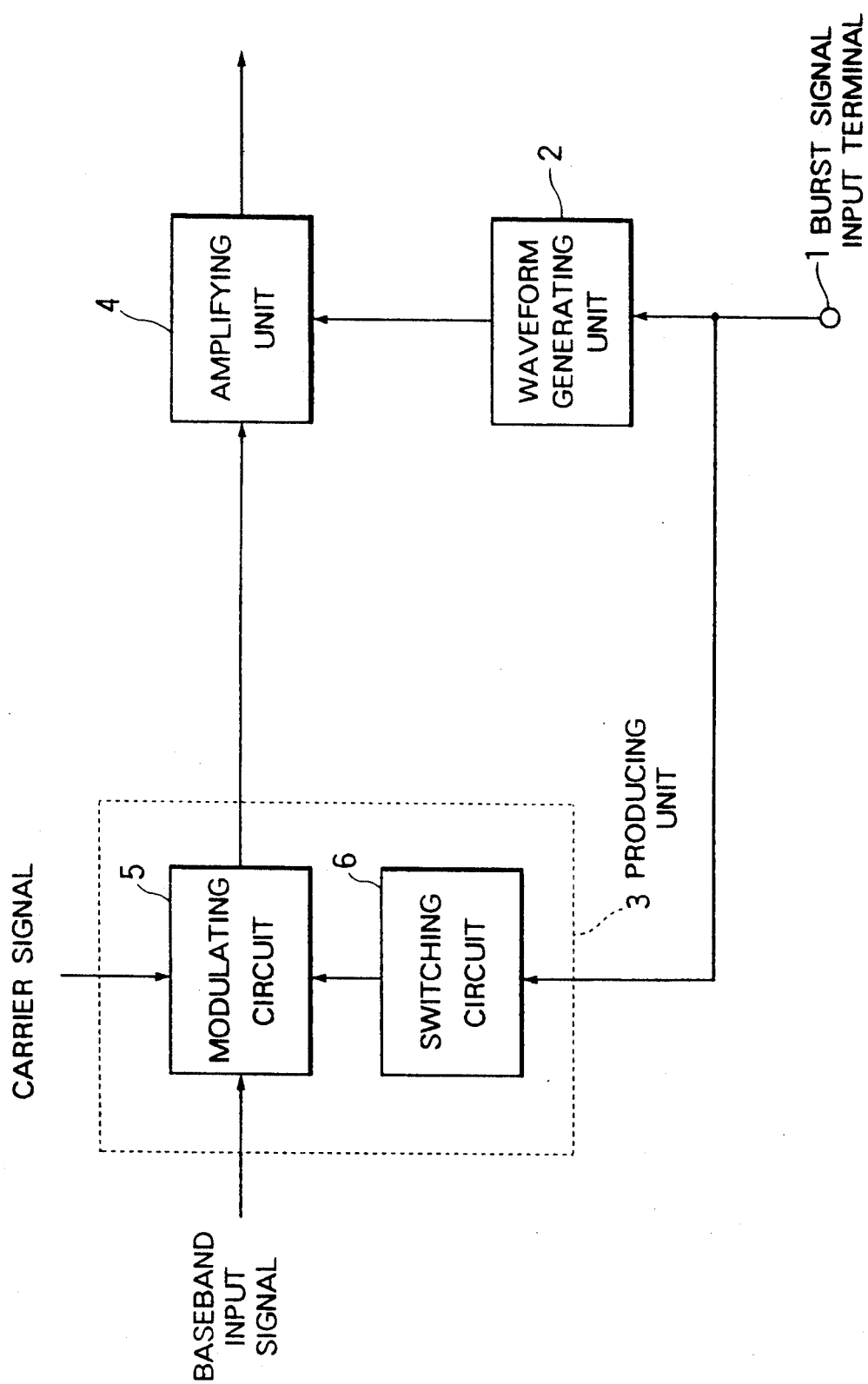
FIG. 1 is a block diagram of a device according to a first embodiment of the instant invention.

Referring to FIG. 1, the device comprises a producing unit 3 for producing a produced signal variable having a power range according to a first embodiment of this invention. A waveform generating unit 2 is for generating a control signal for controlling the power range into a controlled region. An amplifying unit 4 is for amplifying the produced signal having a controlled region.

The producing unit 3 includes a modulating circuit 5 and a switching circuit 6. The modulating circuit 5 is for modulating the baseband signal and the carrier signal into the produced signal. The switching circuit 6 is supplied with a burst control signal from a burst control signal input terminal 1 and switches on and off the modulating circuit 5 to produce a modulated signal and a non-modulated signal one at a time as the produced signal. The waveform generating unit 2 is supplied with the burst control signal from the burst control signal input terminal 1 and generates the control signal for controlling the power range into the controlled region.

Figure 2:
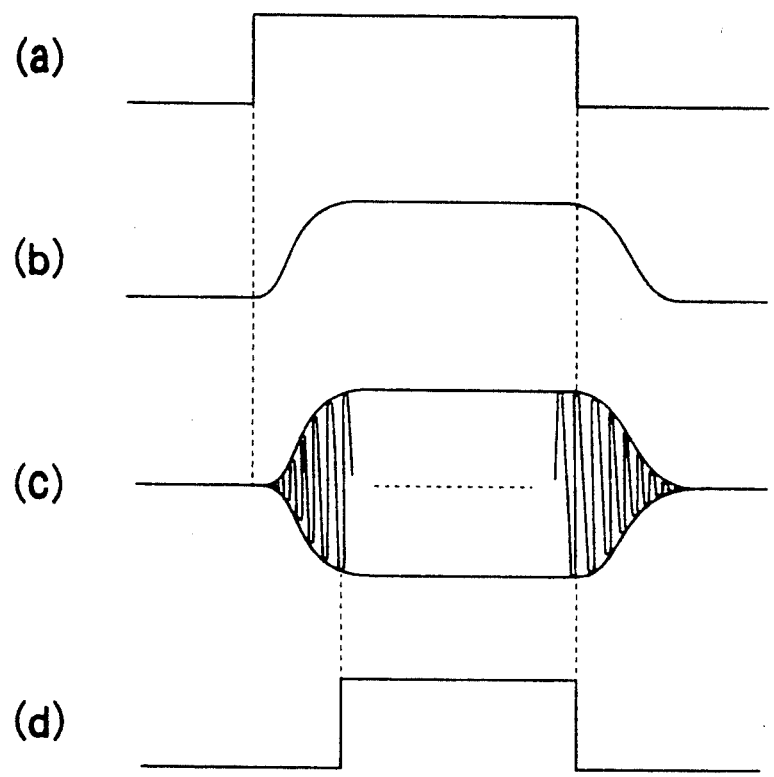
FIG. 2(a) shows one example of a burst control signal which is used in the device illustrated in FIG. 1 and has a rectangular waveform.
FIG. 2(b) shows one example of a control signal which is used in the device illustrated in FIG. 1 and has a controlled shape comprising sloping leading and trailing edges and the plateau between the leading and trailing edges.
FIG. 2(c) shows an envelope of a produced signal which is used in the device illustrated in FIG. 1.
FIG. 2(d) is a time chart of modulation by a switching unit which is used in the device illustrated in FIG. 1.

Referring to FIGS. 2(a) and (b), the burst control signal has a shape comprising a rectangular waveform which has an inherent characteristic and is shown in FIG. 2(a). The waveform generating unit 2 generates the control signal having a controlled shape from the burst control signal, as shown in FIG. 2(b).

The controlled shape comprises sloping leading and trailing edges and a plateau between the leading and trailing edges. Each of the sloping leading and trailing edges has a sloping time interval. The plateau has a plateau time interval.

The sloping time and the plateau time interval can be predetermined from the inherent characteristic of the burst control signal.

Returning to FIGS. 1 and 2(c) and (d), the switching circuit 6 is for switching off the modulating unit 5 during each of the sloping time interval to produce the non-modulated signal and is to switch on during the plateau time interval to produce the modulated signal, as shown in FIG. 2(d).

The amplifying unit 4 is connected to the producing unit 3 and the waveform generating unit 2 and amplifies the produced signal having the controlled region to make the envelope output signal represent an envelope of the produced signal and to produce the envelope output signal, as shown in FIG. 2(c). In this event, when the switching circuit 6 switches off the modulating unit 3 to produce the non-modulated signal.

Figure 3A:
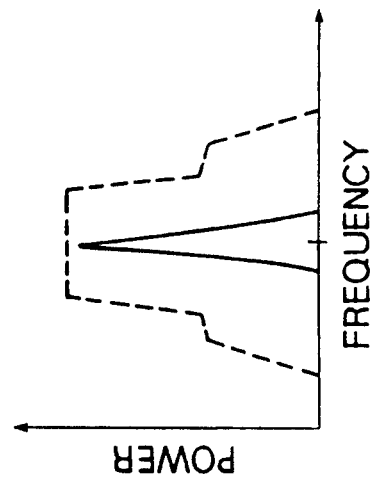
FIG. 3(a) is a graph illustrative of a line spectrum of a non-modulated signal.
Figure 3B:
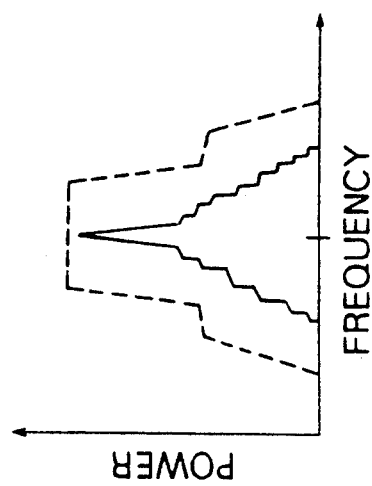
FIG. 3(b) is a graph showing the spectrum divergence of the modulated signal.

FIGS. 1 and 3(a) will be referred to. The amplifying unit 4 amplifies the non-modulated signal to produce the envelope output signal having line spectrum, as shown in FIG. 3(a). On the other hand, when the switching circuit 6 switches on the modulating unit 3 to produce the modulated signal, the amplifying unit 4 amplifies the modulated signal to produce the envelope output signal having spectrum divergence, as shown in FIG. 3(b).

In FIG. 2(c), the envelope output signal could have the line spectrum at the sloping leading and trailing edges and the spectrum divergence at the plateau. Therefore, it is possible to suppress the spectrum divergence to be within a predetermined guard mask which is a permitted limit of the spectrum divergence. This is because the line spectrum of the envelope output signal corresponds to the leading and trailing edges.

Figure 4:
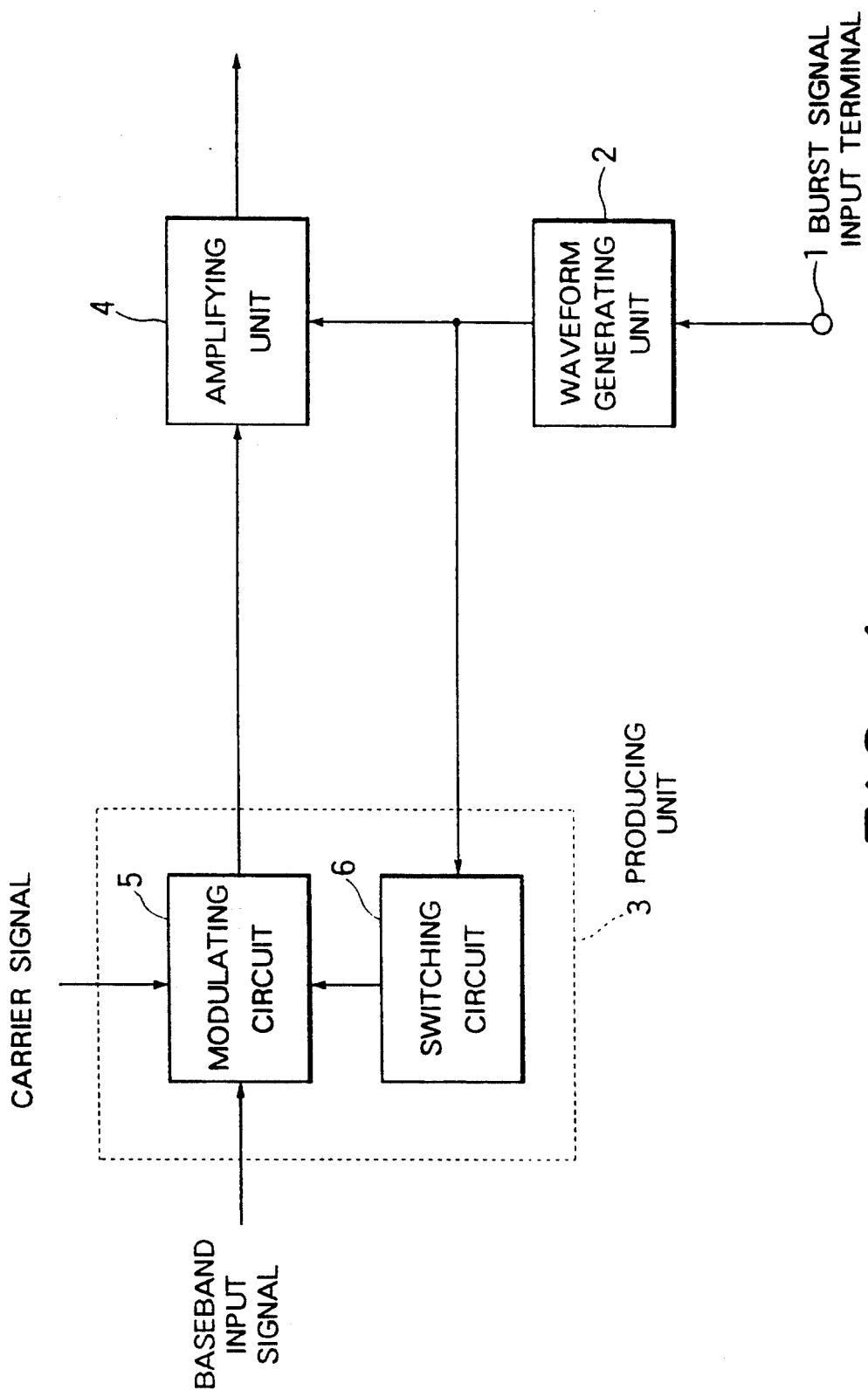
FIG. 4 is a block diagram of a device according to a second embodiment of the instant invention.

Referring to FIG. 4, the description will be made as regards a case where the first switching circuit 6 is supplied with the control signal instead of the burst control signal according to a second embodiment of this invention. The waveform generating unit 2 is connected to the switching circuit 6 and generates the control signal. The control signal comprises a sloping signal and a plateau signal collectively representative of the controlled shape.

In the manner depicted in FIG. 2(b), the sloping signal represents the sloping leading and trailing edges. The plateau signal represents the plateau between the sloping leading and trailing edges.

Returning to FIG. 4, the switching circuit 6 is to switch off the modulating circuit 5 in response to the sloping signal to produce the non-modulated signal and is to switch on in response to the plateau signal to produce the modulated signal in the same manner of the above description.

What is claimed is:

1. A device for use in processing a baseband input signal and a carrier signal into an envelope output signal, said device comprising:

modulating means for modulating said carrier signal with said baseband input signal to produce an output signal;

means for generating a burst control signal;

switching means supplied with said burst control signal for switching said modulating means on and off such that said modulating means produces said output signal when said modulating means is switched on and a non-modulated signal when said modulating means is switched off, wherein said carrier signal and said baseband input signal are modulated only when said modulating means is switched on in response to said switching means;

waveform generating means responsive to said burst control signal for generating a control signal; and amplifying means supplied with said control signal and said output signal for amplifying said output signal to a power range determined by said control signal to generate said envelope output signal.

2. A device for use in processing a baseband input signal and a carrier signal into an envelope output signal, said device comprising:

modulating means for modulating said carrier signal with said baseband input signal to produce an output signal;

means for generating a burst control signal;

waveform generating means responsive to said burst control signal for generating a control signal, wherein said control signal includes sloping leading and trailing edges and a plateau region between said sloping leading and trailing edges;

switching means supplied with said control signal for switching said modulating means on and off such that said modulating means produces said output signal when said modulating means is switched on and a non-modulated signal when said modulating means is switched off, wherein said switching means switches said modulating means off during a time interval corresponding to said sloping leading and trailing edges of said control signal and switches said modulating means on during a time interval corresponding to said plateau region of said control signal, such that modulation occurs only during said time interval corresponding to said plateau region of said control signal; and amplifying means supplied with said control signal and said output signal for amplifying said output signal to a power range determined by said control signal to generate said envelope output signal.

3. A device comprising:

modulating means for modulating a carrier signal with a baseband signal to produce a modulated carrier signal during an on-state, said modulating means producing a non-modulated carrier signal during an off-state;

means for generating a burst control signal;

means responsive to said burst control signal for generating a waveform control signal having a sloping leading edge and a sloping trailing edge and a plateau region between said sloping leading edge and said sloping trailing edge;

means responsive to said waveform control signal for amplifying said modulated carrier signal and said non-modulated carrier signal to produce an amplified signal having an envelope defined by a waveform of said waveform control signal; and means responsive to said waveform control signal for switching said modulating means off during said sloping leading edge and said sloping trailing edge of said waveform control signal, and switching said modulating means on during said plateau region of said waveform control signal.

4. A method for controlling a spectrum of a burst transmission signal, said method comprising the steps of:

generating a burst control signal;

generating in response to said burst control signal a waveform control signal having a sloping leading edge and a sloping trailing edge and a plateau region between said sloping leading edge and said sloping trailing edge;

generating in response to said burst control signal a switch-on signal and a switch-off signal, wherein said switch-on signal and said switch-off signal are supplied to a modulating means;

producing a modulated carrier signal from a carrier signal and a baseband signal in response to said switch-on signal, and producing a non-modulated carrier signal in response to said switch-off signal; and amplifying said modulated and said non-modulated carrier signals in response to said waveform control signal to produce as said burst transmission signal an amplified signal having an envelope defined by a waveform of said waveform control signal.

5. A method for controlling a spectrum of a burst transmission signal, said method comprising the steps of:

generating a waveform control signal having a sloping leading edge and a sloping trailing edge and a plateau region between said sloping leading edge and said sloping trailing edge;

generating in response to said waveform control signal a switch-on signal during a period of time corresponding to said plateau region of said waveform control signal and generating a switch-off signal during a period of time corresponding to a duration of each of said sloping leading edge and said sloping trailing edge, wherein said switch-on signal and said switch-off signal are supplied to a modulating means;

generating a modulated carrier signal in response to said switch-on signal, and generating a non-modulated signal in response to said switch-off signal; and amplifying said modulated and said non-modulated carrier signals in response to said waveform control signal to produce as said burst transmission signal an amplified signal having an envelope defined by a waveform of said waveform control signal.

6. A device comprising:

a modulating circuit for modulating a carrier signal with a baseband signal to produce a modulated carrier signal during an on-state, said modulating circuit producing a non-modulated carrier signal during an off-state;

a waveform generating unit for generating a waveform control signal having a sloping leading edge and a sloping trailing edge and a plateau region between said sloping leading edge and said sloping trailing edge;

an amplifying unit responsive to said waveform control signal for amplifying said modulated and said non-modulated carrier signals to produce an amplified signal having an envelope defined by a waveform of said waveform control signal; and a switching circuit for switching said modulating circuit off during a time corresponding to a duration of each of said sloping leading edge and said sloping trailing edge of said waveform control signal and for switching said modulating circuit on during a time period corresponding to said plateau region of said waveform control signal.

7. A device as claimed in claim 6, further comprising a means for generating a burst control signal, wherein said waveform generating unit generates said waveform control signal in response to said burst control signal; and wherein said switching circuit switches said modulating circuit on and off in response to said waveform control signal.

* * * * *